(No Model.)
W. T. ANDREWS.
BEARING FOR VELOCIPEDES.
No. 371,911. Patented Oct. 25, 1887.
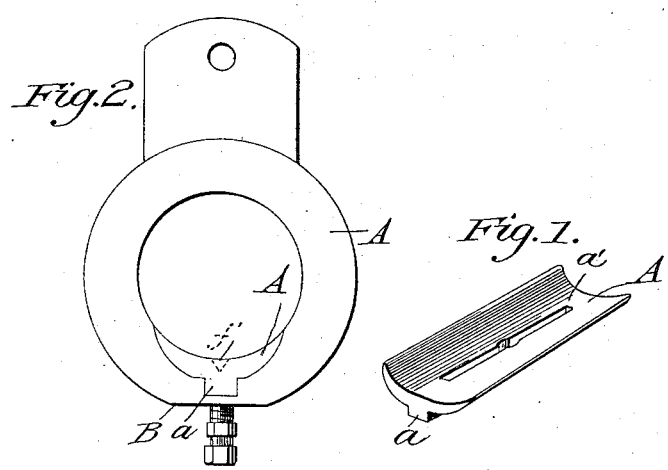
Witnesses.
C Preston Phelps
Frank L. Dyer
William T. Andrews
Inventor.
by Geo W Dyer
Atty.

UNITED STATES PATENT OFFICE.

WILLIAM T. ANDREWS, OF WILLIAMSPORT, PENNSYLVANIA.

BEARING FOR VELOCIPEDES.

SPECIFICATION forming part of Letters Patent No. 371,911, dated October 25, 1887.

Application filed December 4, 1885. Serial No. 184,737. (No model.)

*To all whom it may concern:*

Be it known that I, WILLIAM T. ANDREWS, a citizen of the United States, residing at Williamsport, in the county of Lycoming and State of Pennsylvania, have invented certain new and useful Improvements in Bicycles; and I do hereby declare the following to be a full, clear, and exact description of the invention, such as will enable others skilled in the art to which it appertains to make and use the same.

My invention relates to an improvement in bicycles; and its objects are to provide parallel bearings for the axles which are capable of being adjusted to compensate for any wear of the same, the particular features of my invention being simplicity of construction and durability of wear, all as more explicitly hereinafter described, and set forth in the claims.

To enable others to more perfectly understand my invention reference should be had to the accompanying drawings, wherein—

Figure 1 is a perspective view of the detached key, and Fig. 2 a side elevation of the bearings and adjustable key.

Similar letters denote corresponding parts in both the figures.

A denotes a crescent-shaped key which is inserted in the axle box or bearing A' of the driving-wheel, said box or bearing being properly cut out on its interior to receive said key. This key is of the same length as the box or bearing A', and has on its under side at the center a longitudinal rib or extension, *a*, together with a V-shaped groove, *a'*, cut in its upper side at the center parallel with the rib or extension *a*. This slot does not extend from end to end of the key, as does the rib or extension *a*, but is closed at each end, and is provided to catch the grit, &c., that may collect in the bearings, and is made sloping from each end down to its center, where a hole, *b*, is provided to carry off the grit, &c., that may collect in this groove.

B is an adjusting screw or bolt which passes vertically through a screw-threaded opening in the bottom of the axle box or bearing and screws into the rib *a* of the key, to be adjusted when the bearings become too loose from wear. This adjusting screw or bolt B is made hollow and open at each end to receive and carry off the grit, &c., that may come through the hole *b* from the groove *a'*.

It will be apparent that the adjustable key A may be of any other shape than that of a crescent, so long as the upper side is concave and of a curvature to complete a circle.

The advantages of an adjustable bearing such as I have described and shown will be manifest without special reference.

What I claim, and desire to secure by Letters Patent, is—

1. In a bicycle, the combination, with an axle box or bearing of the wheels, of an adjustable key provided with a rib on the bottom and a groove on the upper side, substantially as and for the purpose set forth.

2. In a bicycle, the combination, with the axle bearings or boxes of the large and small wheels, of the key A, provided with a rib, *a*, groove *a'*, and hole *b*, and the hollow adjusting screw or bolt B, substantially as described.

In testimony whereof I affix my signature in presence of two witnesses.

WILLIAM T. ANDREWS.

Witnesses:
SETH T. McCORMICK,
GEO. E. GROFF.